United States Patent
Okada

(10) Patent No.: US 9,860,401 B2
(45) Date of Patent: Jan. 2, 2018

(54) IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Kazuya Okada, Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/387,785

(22) Filed: Dec. 22, 2016

(65) Prior Publication Data

US 2017/0104883 A1    Apr. 13, 2017

Related U.S. Application Data

(63) Continuation of application No. 14/808,073, filed on Jul. 24, 2015, now Pat. No. 9,565,325.

(51) Int. Cl.
*H04N 1/04* (2006.01)
*H04N 1/00* (2006.01)

(52) U.S. Cl.
CPC ..... *H04N 1/00549* (2013.01); *H04N 1/00557* (2013.01); *H04N 1/00559* (2013.01); *H04N 1/00795* (2013.01); *H04N 2201/0094* (2013.01)

(58) Field of Classification Search
CPC ..... G02C 7/083; G02F 1/133371; G02F 1/29; G02F 2001/291; G02F 2001/294; G05B 19/058; G05B 2219/14038; G05B 9/02; G06F 17/30011; G06F 19/322; H04N 1/00962; H04N 1/32496; H04N 2201/0081

USPC ........................... 358/400, 401, 498; 399/85
See application file for complete search history.

(56) References Cited

U.S. PATENT DOCUMENTS

| | | | |
|---|---|---|---|
| 5,204,755 A | * | 4/1993 | Taga ................ H04N 1/00352 165/80.3 |
| 5,287,323 A | | 2/1994 | Takahashi et al. |
| 5,634,178 A | | 5/1997 | Sugiura et al. |
| 5,796,496 A | * | 8/1998 | Ono ................ H04N 1/00962 358/400 |
| 6,058,583 A | * | 5/2000 | Takeuchi ................ D21F 9/00 28/104 |
| 6,084,622 A | | 7/2000 | Sugiura et al. |
| 6,151,478 A | * | 11/2000 | Katsuta ................ B65H 5/34 271/258.01 |

(Continued)

OTHER PUBLICATIONS

Non-Final Office Action for U.S. Appl. No. 14/808,073 dated Jun. 10, 2016.

*Primary Examiner* — Negussie Worku
(74) *Attorney, Agent, or Firm* — Amin, Turocy & Watson LLP

(57) ABSTRACT

An image forming apparatus comprises a sensor, a base, a clamping section and a limiting section. The sensor includes a hook having a claw section. The sensor is held on the base. The clamping section and the limiting section are arranged on the base. The claw section is clamped with the clamping section. The limiting section is elastically deformable when the sensor is mounted on the base. When the claw section is clamped with the clamping section, the limiting section faces the hook from the opposite side of the clamping section so as to limit the position of the hook.

9 Claims, 11 Drawing Sheets

(56) References Cited

U.S. PATENT DOCUMENTS

| | | | |
|---|---|---|---|
| 6,253,591 B1 * | 7/2001 | Sayama | B21D 7/00 |
| | | | 72/167 |
| 6,290,221 B1 | 9/2001 | Taniyama | |
| 6,470,163 B1 | 10/2002 | Minagawa | |
| 8,675,262 B2 * | 3/2014 | Hanamoto | H04N 1/00519 |
| | | | 358/471 |
| 8,797,610 B2 * | 8/2014 | Hirata | H04N 1/00689 |
| | | | 235/472.01 |
| 8,928,951 B2 * | 1/2015 | Utsunomiya | H04N 1/00801 |
| | | | 358/461 |
| 2004/0051917 A1 * | 3/2004 | Kawazoe | B41J 3/4071 |
| | | | 358/498 |
| 2005/0121848 A1 | 6/2005 | Kodama et al. | |
| 2007/0210040 A1 * | 9/2007 | Sakamoto | B23K 26/0884 |
| | | | 219/121.63 |
| 2008/0150213 A1 | 6/2008 | Kodama et al. | |
| 2009/0214235 A1 | 8/2009 | Hattori | |
| 2010/0157389 A1 * | 6/2010 | Kim | H04N 1/0057 |
| | | | 358/498 |
| 2011/0307911 A1 | 12/2011 | Yamada et al. | |
| 2013/0034366 A1 | 2/2013 | Agatsuma | |
| 2017/0026531 A1 * | 1/2017 | Okada | H04N 1/00559 |

\* cited by examiner (a)

(b)

IMAGE FORMING APPARATUS

CROSS-REFERENCE TO RELATED APPLICATIONS

This application is a Continuation of application Ser. No. 14/808,073 filed on Jul. 24, 2015, the entire contents of which are incorporated herein by reference.

FIELD

Embodiments described herein relate to an image forming apparatus.

BACKGROUND

An image forming apparatus equipped with a sensor is known. For example, the sensor includes a hook having a claw section. A clamping section for clamping the claw section is arranged in a frame. The sensor is fixed in the frame through the clamping of the claw section of the hook with the clamping section.

Sometimes, the image forming apparatus is vibrated when being conveyed. The claw section of the hook may deviate from the clamping section when the vibration is violent. If the claw section of the hook deviates from the clamping section, then the internal sensor of the image forming apparatus may fall off.

DETAILED DESCRIPTION

In accordance with an embodiment, an image forming apparatus comprises a sensor, a base, a clamping section and a limiting section. The sensor includes a hook having a claw section. The sensor is mounted on the base. The clamping section and the limiting section are arranged on the base. The claw section is clamped with the clamping section. The limiting section is elastically deformable when the sensor is mounted on the base. When the claw section is clamped with the clamping section, the limiting section faces the hook from the opposite side of the clamping section, thereby limiting the position of the hook.

The image forming apparatus of the present invention is described below with reference to accompanying drawings. In the following description, structures having identical or similar function are denoted by the same reference signs. Moreover, description of such structures is omitted in some cases.

Embodiment 1

Figure 1:
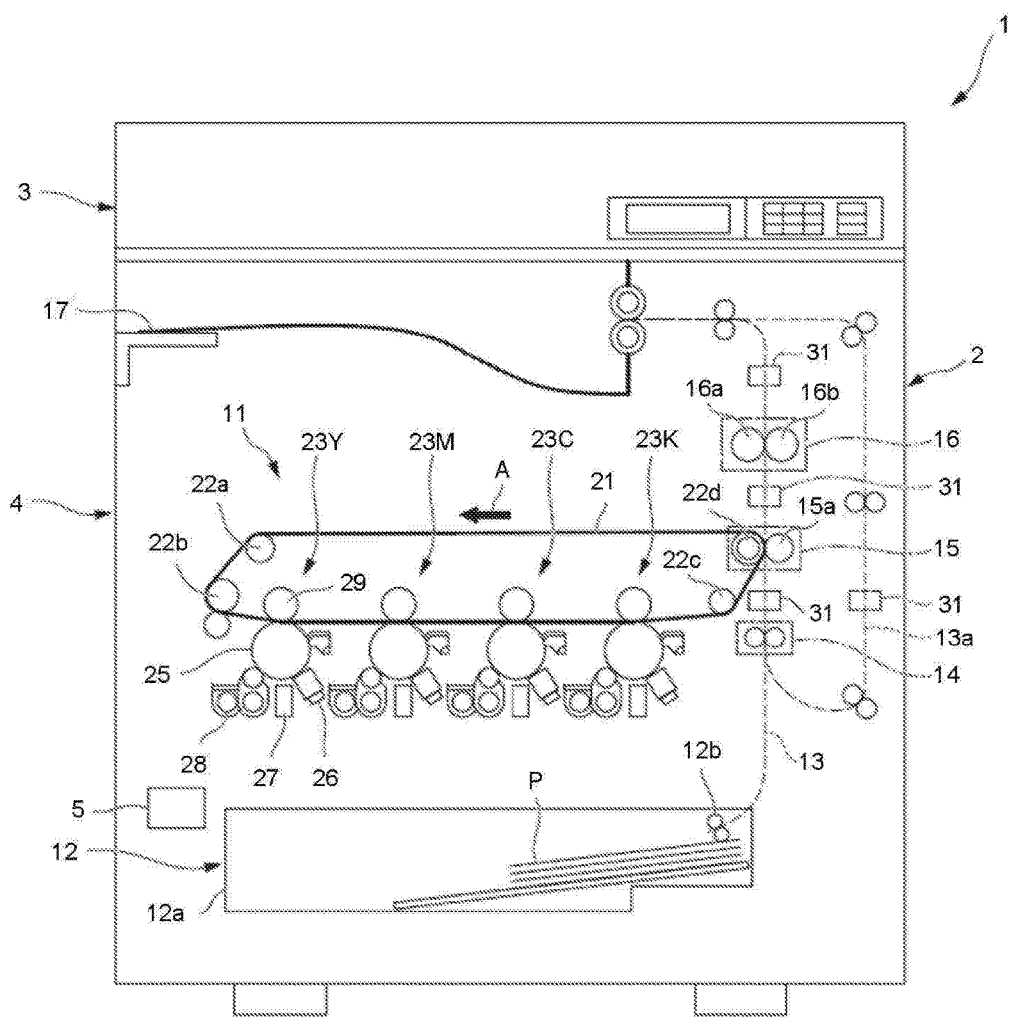
FIG. 1 is a schematic diagram exemplifying the structure of an image forming apparatus according to embodiment 1.

FIG. 1 exemplifies the structure of an image forming apparatus 1 according to embodiment 1. As shown in FIG. 1, the image forming apparatus 1 is an electrophotographic type Multi-Function Peripheral (MFP).

First, the whole structure of the image forming apparatus 1 is described.

The image forming apparatus 1 comprises a frame 2, a scanner unit 3, a printer unit 4 and a control unit 5.

The frame (housing, casing) 2 constitutes the frame of the image forming apparatus 1. The frame 2 is formed into, for example, a box shape. The frame 2 accommodates the scanner unit 3 and the printer unit 4.

The scanner unit 3 reads the image information of an original as digital data.

The printer unit 4 forms an image on a sheet according to image data. The image forming apparatus 1 forms an image with a recording agent which is, for example, toner.

The control unit 5 controls the whole image forming apparatus 1. That is, the control unit 5 controls the scanner unit 3 and the printer unit 4.

Next, the printer unit 4 is described below in detail.

The printer unit 4 includes an intermediate transfer section 11, a paper feeding section 12, a conveyance path 13, a resist section 14, a secondary transfer section 15, a fixing section 16 and a paper discharging section 17.

The intermediate transfer section (primary transfer section) 11 comprises an intermediate transfer belt 21, a plurality of rollers 22a, 22b, 22c and 22d and a plurality of image forming portions 23Y, 23M, 23C and 23K.

The intermediate transfer belt 21 is formed into a ring shape. The plurality of rollers 22a, 22b, 22c and 22d support the intermediate transfer belt 21 so that the intermediate transfer belt 21 can travel circularly in the direction indicated by an arrow A shown in FIG. 1.

The plurality of image forming portions (processing units) 23Y, 23M, 23C and 23K include a yellow image forming portion 23Y, a magenta image forming portion 23M, a cyan image forming portion 23C and a black image forming portion 23K. The image forming portions 23Y, 23M, 23C and 23K each include a photoconductive drum 25, a charging portion 26, an exposure portion 27, a developing portion 28 and a transfer roller 29. The image forming portions 23Y, 23M, 23C and 23K are structurally identical except for the difference in the color of recording agent.

The charging portion (charger) 26 charges the surface of the photoconductive drum 25.

The exposure portion (exposure scanning head) 27 exposes the surface of the photoconductive drum 25 to form an electrostatic latent image on the surface of the photoconductive drum 25 based on image data.

The developing portion 28 capable of accommodating toners of different colors feeds recording agent to the surface of the photoconductive drum 25 so that the latent image on the photoconductive drum 25 is affixed with the recording agent.

The transfer roller 29 faces the intermediate transfer belt 21 from the side opposite of the photoconductive drum 25 to transfer (primarily transfer) a recording agent from the surface of the photoconductive drum 25 to the intermediate transfer belt 21.

Next, the paper feeding section 12, the conveyance path 13, the resist section 14, the secondary transfer section 15, the fixing section 16 and the paper discharging section 17 are described below.

The paper feeding section 12 comprises a paper cassette 12a and a pickup roller 12b. The paper cassette 12a arranged in the frame 2 can be drawn out from the frame 2. The paper cassette 12a is capable of accommodating a sheet P to be printed with an image. The pickup roller 12b is arranged in the paper cassette 12a. The pickup roller 12b conveys the sheet P accommodated in the paper cassette 12a towards the conveyance path 13.

Starting with the paper feeding section 12, the conveyance path 13 passes the resist section 14, the secondary transfer section 15 and the fixing section 16 and ends with the paper discharging section 17. The paper P is conveyed in the conveyance path 13.

In the embodiment, the conveyance path 13 includes a reverse conveyance path 13a which returns the paper P passing the fixing section 16 to the resist section 14. The two sides of the paper P are inverted when the paper P passes the reverse conveyance path 13a so as to form an image on the back of the paper P.

The resist section (resist roller pair) 14 is positioned between the paper feeding section 12 and the secondary transfer section 15. The resist section 14 temporarily limits the paper P. Then, the paper P is paused. The resist section 14 conveys the paper P towards the secondary transfer section 15 matching in timing with the conveyance of the recording agent transferred on the intermediate transfer belt 21.

The secondary transfer section 15 comprises a transfer roller 15a which is connected with the outer side of the intermediate transfer belt 21. The belt roller 22d supporting the intermediate transfer belt 21 constitutes a structural element of the secondary transfer section 15. The belt roller 22d is opposite to the transfer roller 15a across the intermediate transfer belt 21. The paper P is clamped between the transfer roller 15a and the belt roller 22d together with the intermediate transfer belt 21. In this way, the recording agent on the intermediate transfer belt 21 is transferred (secondarily transferred) onto the surface of the paper P. The paper P passing the secondary transfer section 15 is sent to the fixing section 16.

The fixing section 16 comprises a heat roller 16a and a press roller 16b. The temperature of the heat roller 16a is controlled at a fixation temperature (printing temperature) suitable for the fixation of the recording agent. The press roller 16b faces the paper P from the opposite side of the heat roller 16a. The paper P on which the recording agent is transferred is clamped by the heat roller 16a and the press roller 16b so as to be heated and pressurized between the heat roller 16a and the press roller 16b. Then, the recording agent transferred on the paper P is fixed on the paper P.

The paper discharging section 17 discharges the paper P passing the fixing section 16.

Next, a sensor unit 31 arranged in the image forming apparatus 1 is described below.

As shown in FIG. 1, the sensor unit 31 is arranged on the conveyance path 13. For example, the sensor unit 31 is located between the resist section 14 and the secondary transfer section 15. Further, the sensor unit 31 is not limited to be installed at a specific position. For example, the sensor unit 31 may also be arranged between the secondary transfer section 15 and the fixing section 16 or between the fixing section 16 and the paper discharging section 17. The sensor unit 31 may also be arranged on the reverse conveyance path 13a.

The sensor unit 31 detects the position of the paper P in the conveyance path 13. For example, the sensor unit 31 detects the entrance of the paper P into a specific area. Further, the sensor unit 31 detects the departure of the paper P from the specific area.

Figure 2:
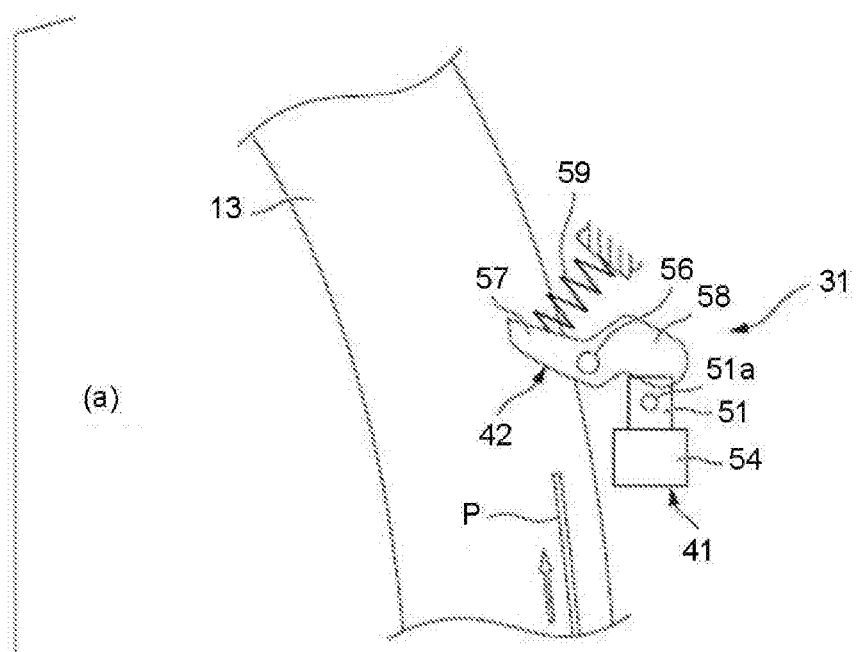
FIG. 2 is a front view of the sensor unit shown in FIG. 1.
Figure 2:
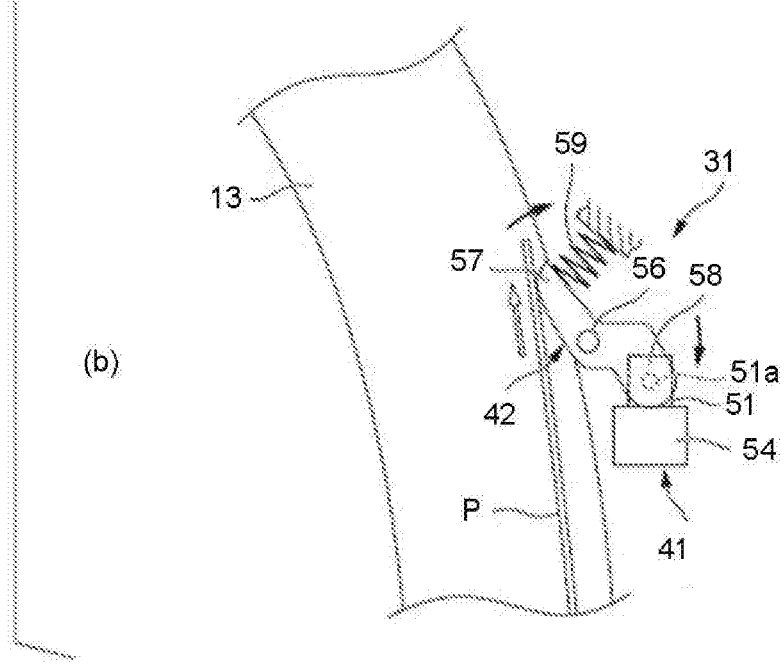

FIG. 2 illustrates the sensor unit 31 specifically. As shown in FIG. 2, the sensor unit 31 comprises a sensor 41 and a working part 42.

The sensor 41 is described first.

Figure 3:
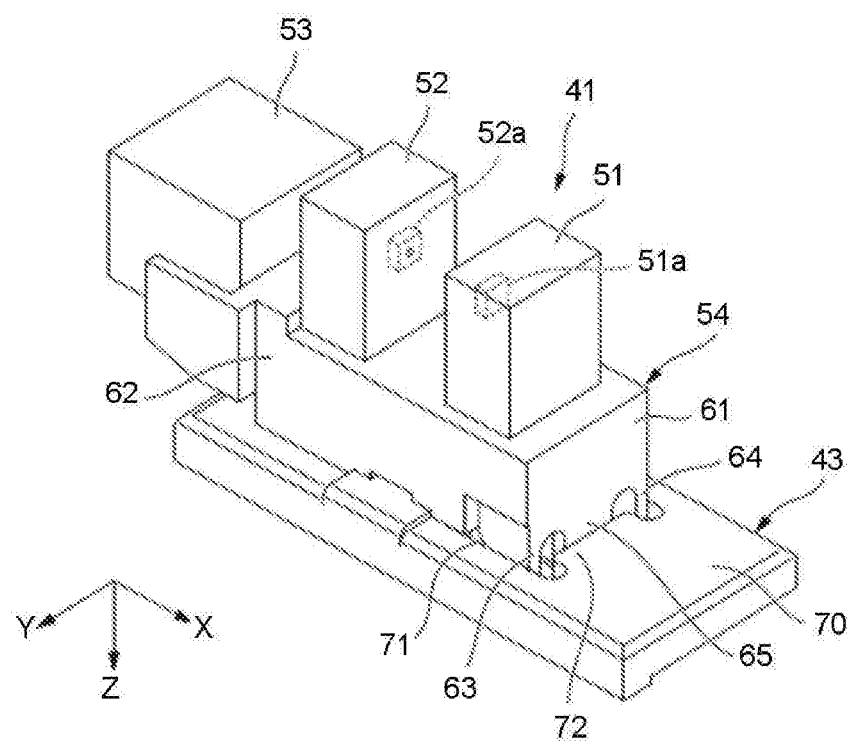
FIG. 3 is an oblique view of the sensor and the base shown in FIG. 2.

FIG. 3 illustrates the sensor 41 and a base 43. For example, the sensor 41 is an optical sensor. As shown in FIG. 3, the sensor 41 comprises a light emitting unit 51, a light receiving unit 52, a connector 53 and a retainer unit 54.

The light emitting unit 51 comprises a light emitting component 51a. The light emitting unit 51 emits light towards the light receiving unit 52.

The light receiving unit 52 comprises a light receiving component 52a. The light receiving unit 52 receives the light emitted from the light emitting unit 51.

The sensor 41 carries out a detection action when the light emitted from the light emitting unit 51 towards the light receiving unit 52 is shielded. The 'detection action', as mentioned herein, refers to the output of a specific signal to the outside. Further, the light emitting unit 51 and the light receiving unit 52 may be reverse to each other in position.

The connector 53 is electrically connected with the control unit 5 of the image forming apparatus 1 via a cable. The connector 53 outputs the detection result of the sensor 41 to the control unit 5.

The retainer unit 54 retains the light emitting unit 51, the light receiving unit 52 and the connector 53 as a whole. The retainer unit 54 is made from a synthetic resin (e.g. plastic). The retainer unit 54 is described in detail later.

Next, the working part (execution unit) 42 is described.

As shown in FIG. 2, the working part 42 includes a pivot 56, a first part 57 and a second part 58.

The pivot 56 located between the first part 57 and the second part 58 can be rotationally supported in the frame 2. The working part 42 can be rotated in the range between a first gesture ((a) shown in FIG. 2) and a second gesture ((b) shown in FIG. 2) by taking the pivot 56 as the center.

An elastic component 59 is propped against the working part 42. For example, the elastic component 59 is a spring. The working part 42 applies a force towards the first gesture via the elastic component 59.

The first part 57 protrudes towards the conveyance path 13 in the first gesture. The paper P moving in the conveyance path 13 is connected with the first part 57. When the paper P is connected with the first part 57, the working part 42 rotates from the first gesture to the second gesture.

The second part 58 is integrated with the first part 57. The second part 58 departs from the space between the light emitting unit 51 and the light receiving unit 52 of the sensor 41 in the first gesture. On the other hand, the second part 58 enters the space between the light emitting unit 51 and the light receiving unit 52 of the sensor 41 in the second gesture so as to shield, in the second gesture, the light emitted from the light emitting unit 51 to the light receiving unit 52. The sensor 41 shields the light by means of the second part 58, thereby carrying out a detection action. That is, the sensor 41 shields the light emitted from the light emitting unit 51 towards the light receiving unit 52, thereby detecting the position of the paper P.

The sensor 41 outputs the detection result of the sensor 41 to the control unit 5. The control unit 5 controls the paper feeding section 12, the resist section 14, the secondary transfer section 15 and the fixing section 16 according to the detection result of the sensor 41.

Sequentially, the installation of the sensor 41 is described.

X direction, Y direction and Z direction are defined here. The X direction and the Y direction are directions along the holding side 70 (refer to FIG. 4) of the under-mentioned base 43. The X direction is the length direction of the sensor 41. For example, The X direction is the direction in which the light emitting unit 51 and the light receiving unit 52 are arranged. The Y direction is a direction intersecting with (e.g. nearly orthogonal to) the X direction. For example, The Y direction is the width direction of the sensor 41. The Z direction is a direction intersecting with (e.g. nearly orthogonal to) the X direction and the Y direction. The Z direction is the direction in which the sensor 41 is mounted on the base 43. The Z direction is the direction from which the first hook 65 of the sensor 41 is inserted.

Figure 4:
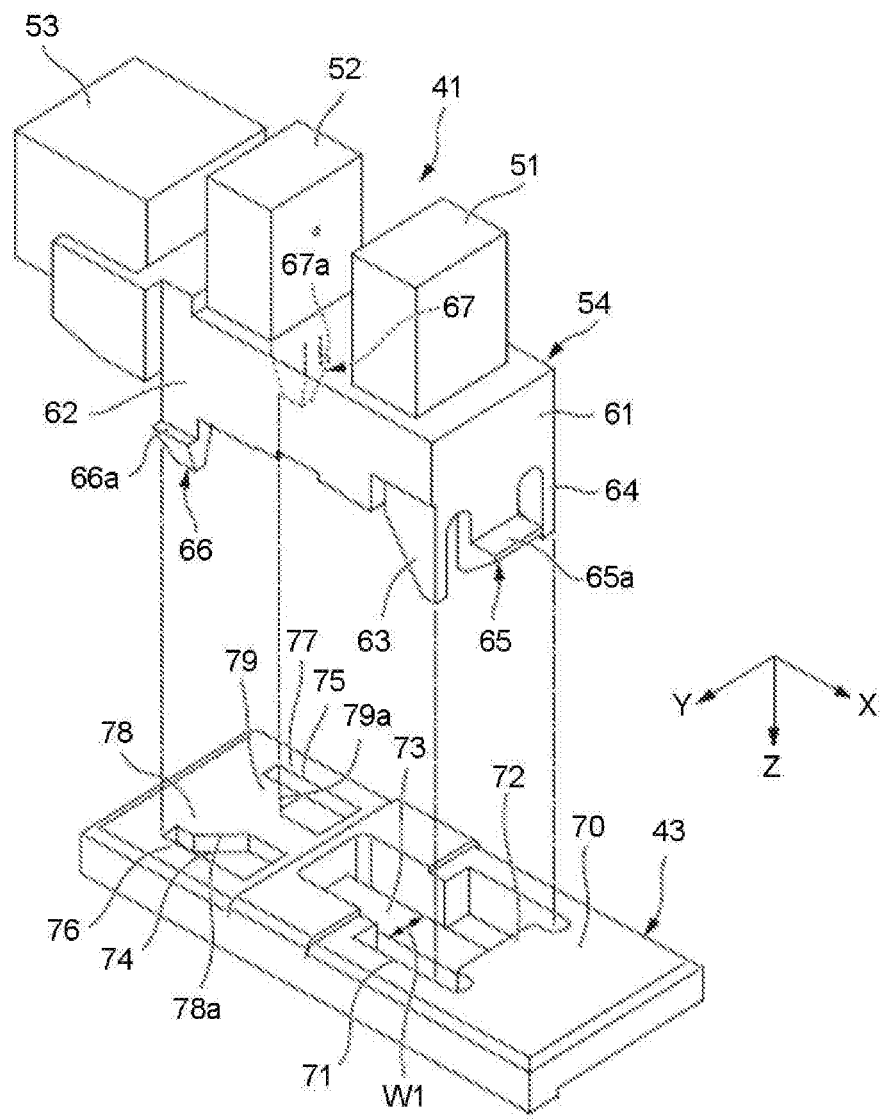
FIG. 4 is an oblique view of the sensor and the base shown in FIG. 2.

FIG. 4 illustrates the sensor 41 and the base 43. As shown in FIG. 4, the retainer unit 54 of the sensor 41 includes a first end section 61, a second end section 62, a first insertion section 63, a second insertion section 64, a first hook 65, a second hook 66 and a third hook 67.

The first end section 61 and the second end section 62 are the two ends of the retainer unit 54 in the X direction. The second end section 62 is located on the opposite side of the first end section 61 and connected with the connector 53.

The first insertion section 63 and the second insertion section 64 are arranged on the first end section 61 of the retainer unit 54. The first insertion section 63 and the second insertion section 64 are separately located on the two ends of the retainer unit 54 in the Y direction. The first insertion section 63 and the second insertion section 64 protrude towards the Z direction. The first insertion section 63 and the second insertion section 64 function as guiders for guiding the installation of the sensor 41.

The first hook 65 is arranged on the first end section of the retainer unit 54, located between the first insertion section 63 and the second insertion section 64 and protruded towards the Z direction. The first hook 65 is elastically deformable. For example, the first hook 65 is elastically deformable in the X direction and a direction opposite to the X direction. The first hook 65 has a claw section 65a which is protruded from the first hook 65 towards the X direction.

The second hook 66 and the third hook 67 are arranged on the second end section 62 of the retainer unit 54. The second hook 66 and the third hook 67 are separately located on the two ends of the retainer unit 54 in the Y direction. The second hook 66 and the third hook 67 are protruded towards the Z direction. The second hook 66 has a claw section 66a. The third hook 67 has a claw section 67a. The claw section 66a of the second hook 66 and the claw section 67a of the third hook 67 extend towards the outside of the retainer unit 54 along the Y direction. That is, the claw section 66a of the second hook 66 and the claw section 67a of the third hook 67 extend towards opposite directions.

Sequentially, the base (sensor holder) 43 is described.

The base 43 is a part on which the sensor 41 is installed. The base 43 is arranged inside the frame 2. For example, the base 43 is a part of a synthetic resin component (molded component) inside the frame 2. For example, the base 43 is a part of the components forming the conveyance path 13. Further, the base 43 may be integrated with the frame 2.

As shown in FIG. 4, the base 43 has a holding side 70, a first opening section 71, a first clamping section 72, a first limiting section 73, a second and a third opening section 74 and 75, a second and a third clamping section 76 and 77 and a second and a third limiting section 78 and 79.

The sensor 41 is held on the holding side 70 along the Z direction. Further, the 'side', as used herein, refers to 'surface'. That is, the holding side 70 may be accidented, not limited to be a flat surface.

The first opening section 71 is opened on the holding side 70. The first opening section 71 penetrates through the base 43 in the Z direction. The first insertion section 63, the second insertion section 64 and the first hook 65 of the sensor 41 are inserted into the first opening section 71 along the Z direction. The inner surface of the first opening section 71 faces the first insertion section 63 and the second insertion section 64 of the sensor 41 so as to limit the position of the sensor 41 in the Y direction.

The first clamping section 72 arranged on one end of the first opening section 71 in the X direction is an example of a 'clamping section'. The first clamping section 72 extends from an inner surface of the first opening section 71 towards the inside of the first opening section 71. For example, the first clamping section 72 is formed into a flat plate.

Figure 5:
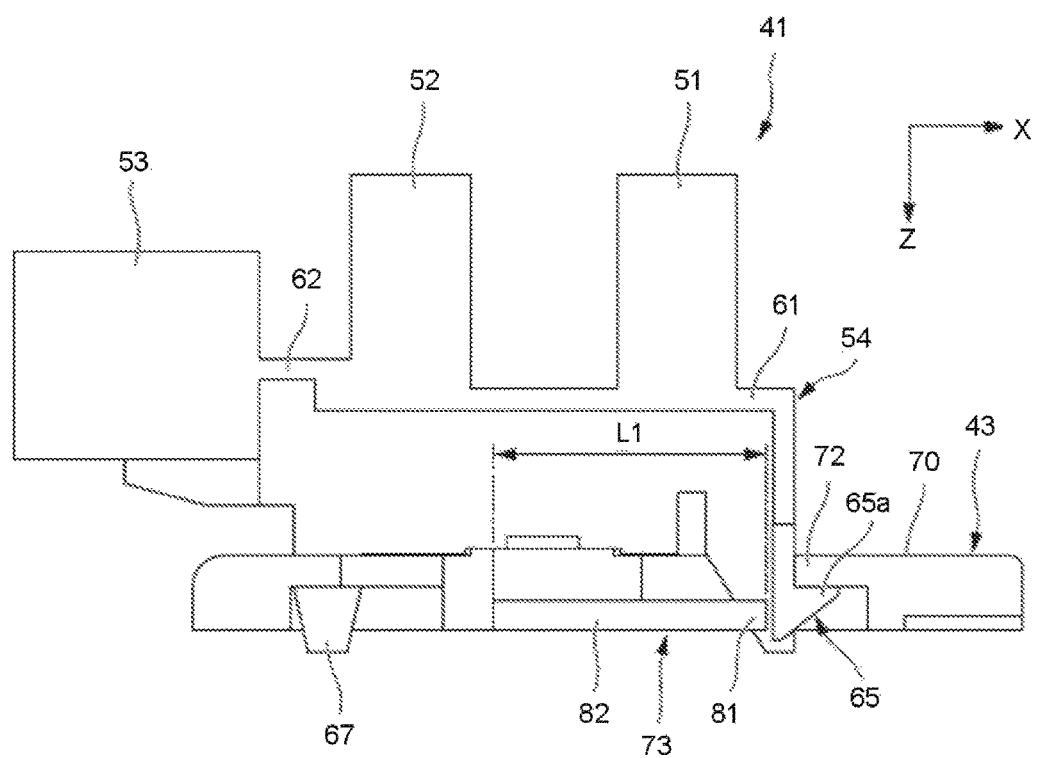
FIG. 5 is a sectional view of the sensor and the base shown in FIG. 2.

FIG. 5 shows the sections of the sensor 41 and the base 43. As shown in FIG. 5, the claw section 65a of the first hook 65 is clamped with the first clamping section 72. For example, the claw section 65a of the first hook 65 is mounted into the first clamping section 72 from the opposite side of the holding side 70. In this way, the first end section 61 of the retainer unit 54 of the sensor 41 is fixed on the base 43.

As shown in FIG. 4, the first limiting section (support section) 73 is arranged on the end of the first opening section 71 in the direction opposite to the X direction. The first limiting section 73 is an example of a 'limiting section'. As shown in FIG. 5, the first limiting section 73 extends from an inner surface of the first opening section 71 towards the inside of the first opening section 71. The first limiting section 73 extends in the X direction. For example, the first limiting section 73 is formed into a plate linearly extending in the X direction. The length L1 (refer to FIG. 5) of the first limiting section 73 in the X direction is greater than the width W1 (refer to FIG. 4) of the first limiting section 73 in the Y direction. Thus, the first limiting section 73 is greatly elastically deformable in the Z direction.

Described more specifically, the first limiting section 73 has an end part 81 and an extending part 82.

The end part 81 is the end of the first limiting section 73 in the X direction. The end part 81 is referred to as a free end of a cantilever.

The extending part 82 extends from the end part 81 towards the direction opposite to the X direction. The extending part 82 extending linearly from the end part 81 is connected with the base 43 so that the first limiting section 73 is supported on the base 43. That is, the first limiting section 73 is formed as a cantilever.

Sequentially, the relationship between the first hook 65 and the first limiting section 73 is described.

As shown in FIG. 5, the first limiting section 73 faces the first hook 65 from the opposite side of the first clamping section 72 when the claw section 65a is clamped with the first clamping section 72. Specifically, the end part 81 of the first limiting section 73 faces the first hook 65 in the X direction so that the first limiting section 73 limits the position of the first hook 65 in the X direction. The first limiting section 73 limits the movement of the first hook 65 away from the first clamping section 72. The first limiting section 73 limits the first hook 65 at the position where the claw section 65a is clamped with the first clamping section 72 (that is, the position where the claw section 65a is not separated from the first clamping section 72).

Sequentially, the size of each part of the sensor 41 and the base 43 is exemplified.

Figure 6:
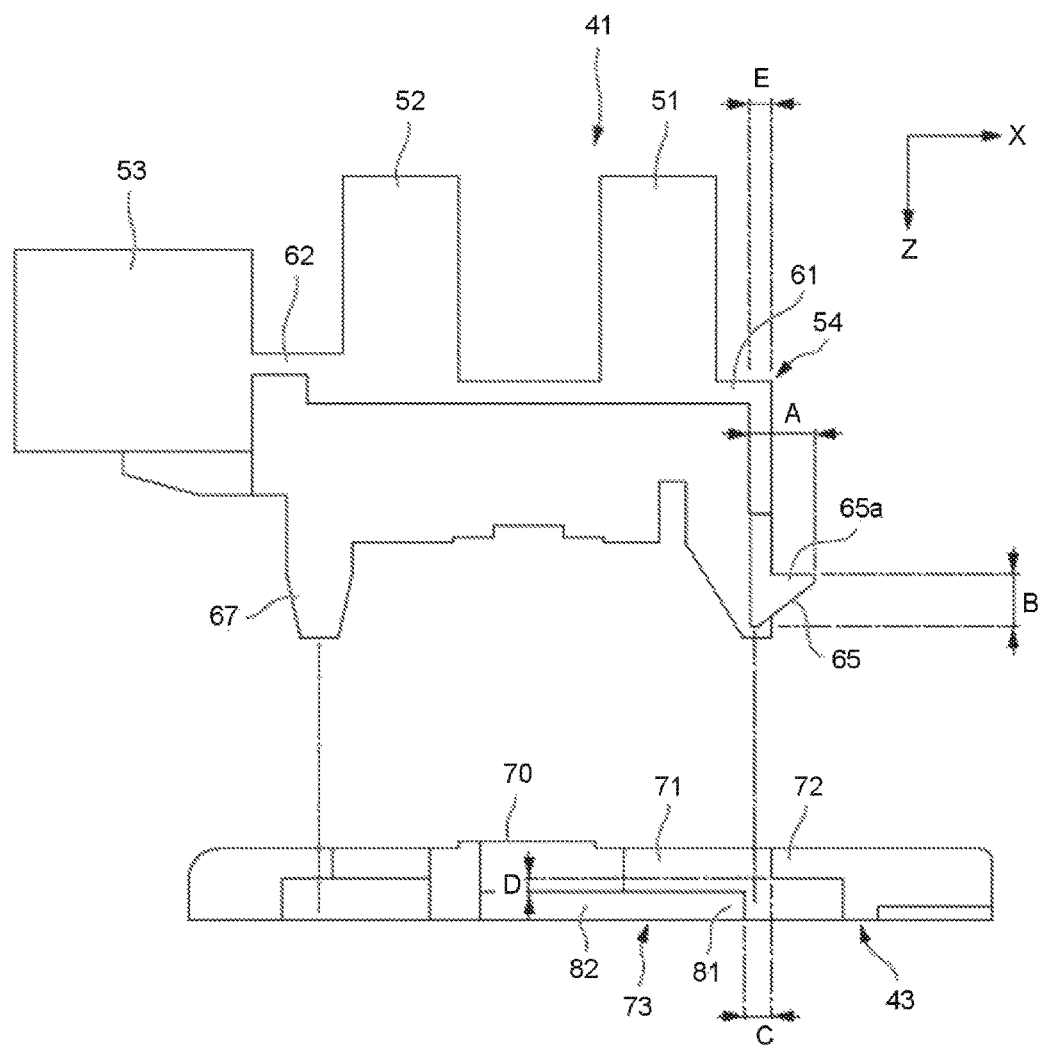
FIG. 6 is a sectional view of the sensor and the base shown in FIG. 2.

FIG. 6 shows the sections of the sensor 41 and the base 43. As shown in FIG. 6, the width A of the first hook 65 having the claw section 65a in the X direction is 2.1 mm-4.5 mm. On the other hand, the width E of the first hook 65 not having the claw section 65a in the X direction is 0.6 mm-3.0 mm. Further, the gap between the first clamping section 72 and the first limiting section 73 in the X direction is set to be C. Here, as the first hook 65 is clamped with the first clamping section 72, the following relational expression should be met: A>C>E. Thus, it is set that the gap C between the first clamping section 72 and the first limiting section 73 in the X direction is 0.6 mm-4.5 mm.

Further, the thickness B of the claw section 65a in the Z direction is 1.8 mm-2.3 mm. The gap between the first clamping section 72 and the first limiting section 73 in the Z direction is set to be D. Here, as the first hook 65 is clamped with the first clamping section 72, the following relational expression should be met: B>D. Thus, it is set that the gap D between the first clamping section 72 and the first limiting section 73 in the Z direction is below 2.3 mm.

Next, the second and the third opening section 74 and 75, the second and the third clamping section 76 and 77 and the second and the third limiting section 78 and 79 are described.

As shown in FIG. 4, the second and the third opening section 74 and 75 are openings on the holding side 70. The second and the third opening section 74 and 75 penetrate through the base 43 in the Z direction. The second hook 66 of the sensor 41 is inserted into the second opening section 74 along the Z direction. The third hook 67 of the sensor 41 is inserted into the third opening section 75 along the Z direction.

The second clamping section 76 is arranged on the base 43. The claw section 66a of the second hook 66 is clamped with the second clamping section 76. For example, the claw section 66a of the second hook 66 is mounted into the second clamping section 76 from the opposite side of the holding side 70.

Similarly, the third clamping section 77 is arranged on the base 43. The claw section 67a of the third hook 67 is clamped with the third clamping section 77. For example, the claw section 67a of the third hook 67 is mounted into the third clamping section 77 from the opposite side of the holding side 70. In this way, the second end section 62 of the retainer unit 54 of the sensor 41 is fixed on the base 43.

The second limiting section 78 faces the second hook 66 from the opposite side of the second clamping section 76 when the claw section 66a of the second hook 66 is clamped with the second clamping section 76. The second limiting section 78 limits the movement of the second hook 66 away from the second clamping section 76.

The second limiting section 78 includes an inclined side 78a which is inclined towards a direction departing from the second hook 66 as the inclined side 78a advances in the X direction. Thus, the limitation of the second limiting section 78 to the second hook 66 is released when the second hook 66 is moved towards the X direction. In this way, the claw section 66a of the second hook 66 is deviated from the second clamping section 76.

Similarly, the third limiting section 79 faces the third hook 67 from the opposite side of the third clamping section 77 when the claw section 67a of the third hook 67 is clamped with the third clamping section 77. The third limiting section 79 limits the movement of the third hook 67 away from the third clamping section 77.

The third limiting section 79 includes an inclined side 79a which is inclined towards a direction departing from the third hook 67 as the inclined side 79a advances in the X direction. Thus, the limitation of the third limiting section 79 to the third hook 67 is released when the third hook 67 is moved towards the X direction. In this way, the claw section 67a of the third hook 67 is deviated from the third clamping section 77.

Sequentially, a method for mounting the sensor 41 on the base 43 is exemplified.

Figure 7:
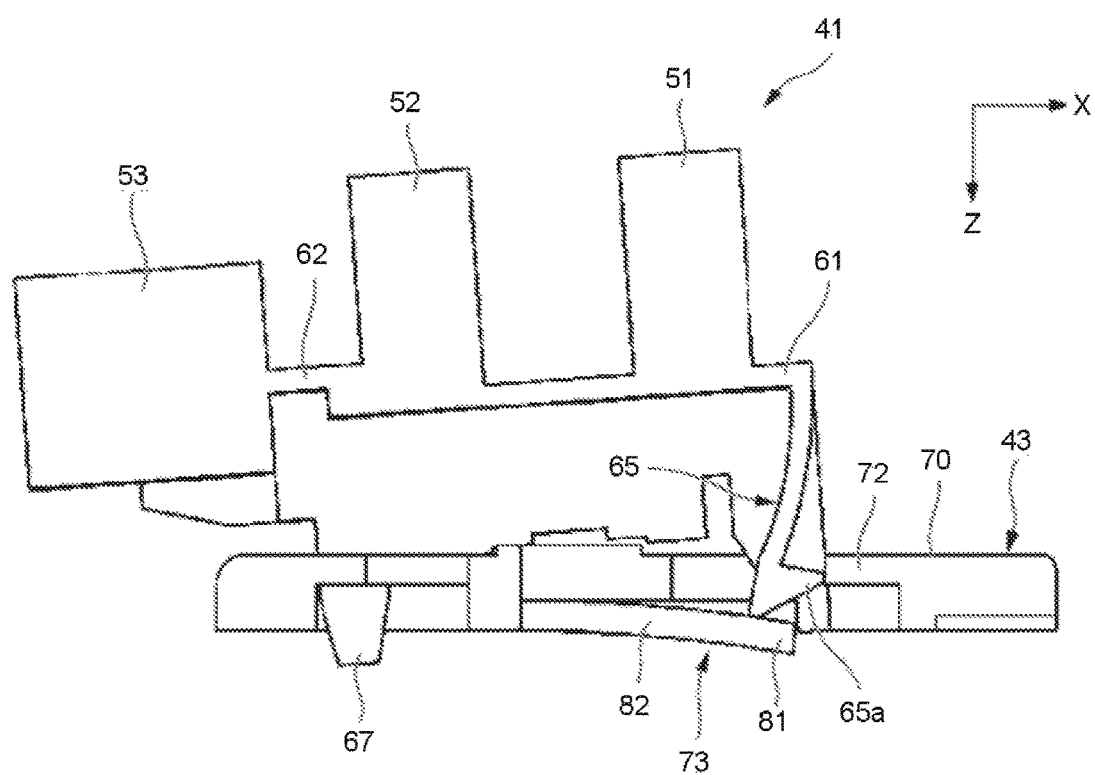
FIG. 7 is a sectional view of the sensor and the base shown in FIG. 2.

FIG. 7 illustrates a method for mounting the sensor 41 on the base 43. As shown in FIG. 7, in the mounting of the sensor 41 on the base 43, first, the second hook 66 and the third hook 67 of the sensor 41 are inserted into the second opening section 74 and the third opening section 75 of the base 43 so that the second hook 66 and the third hook 67 are clamped with the second clamping section 76 and the third clamping section 77. Further, the positions of the second hook 66 and the third hook 67 are limited by the second limiting section 78 and the third limiting section 79.

Next, the first hook 65 of the sensor 41 is inserted into the first opening section 71 of the base 43. Specifically, the first hook 65 is inserted between the first clamping section 72 and the first limiting section 73. In this case, the first hook 65 is elastically deformed in a direction departing from the first clamping section 72 when the claw section 65a of the first hook 65 passes the first clamping section 72. At this time, as the claw section 65a of the first hook 65 passes the first clamping section 72, the first limiting section 73 is elastically deformed in the direction from which the first hook 65 is inserted. As a consequence, the claw section 65a of the first hook 65 is clamped with the first clamping section 72.

If the claw section 65a of the first hook 65 is clamped with the first clamping section 72, then the first hook 65 is recovered to a state in which the first hook 65 is not elastically deformed. Similarly, the first limiting section 73 is recovered to a state in which the first limiting section 73 is not elastically deformed. In this way, the first limiting section 73 faces the first hook 65 from the opposite side of the first clamping section 72 to limit the position of the first hook 65.

With this structure, the sensor 41 in the image forming apparatus 1 is prevented from falling off.

For example, to prevent the internal sensor 41 from falling off, it is also considered to mount another component to prevent the deviation of the sensor 41. In this case, the number of the parts of the image forming apparatus 1 is increased, and the procedures of assembling the image forming apparatus 1 are also increased.

Further, as another method, it is also considered to position a hook for preventing the deviation of the sensor 41 on the base 43. Fox example, the hook is arranged at a position between the light emitting unit 51 and the light receiving unit 52 of the sensor 41. In this case, the hook is partially located at a position between the light emitting unit 51 and the light receiving unit 52. Thus, sometimes, the detection allowance of the sensor 41 may be reduced.

On the other hand, the image forming apparatus 1 of the embodiment comprises the sensor 41, the base 43, the first clamping section 72 and the first limiting section 73. The sensor 41 includes the first hook 65 having the claw section 65a. The sensor 41 is mounted on the base 43. The first clamping section 72 and the first limiting section 73 are arranged on the base 43. The claw section 65a of the first hook 65 is clamped with the first clamping section 72. The first limiting section 73 is elastically deformable when the sensor 41 is mounted on the base 43. When the claw section 65a is clamped with the first clamping section 72, the first limiting section 73 faces the first hook 65 from the opposite side of the first clamping section 72 to limit the position of the first hook 65.

With this structure, the position of the first hook 65 is limited by the first limiting section 73. Then, even if the image forming apparatus 1 is vibrated relatively violently, it is difficult for the claw section 65a of the first hook 65 to deviate from the first clamping section 72. Thus, the sensor 41 in the image forming apparatus 1 is prevented from falling off. Further, according to the structure of the embodiment, no other parts are needed. It is impossible that the detection allowance of the sensor 41 is reduced. Further, it is not needed to change the shape of the sensor 41.

In the embodiment, when the first hook 65 is inserted between the first limiting section 73 and the first clamping section 72, the first limiting section 73 is elastically deformed in the direction from which the first hook 65 is inserted. With this structure, even in a structure equipped with the first limiting section 73, the claw section 65a of the first hook 65 can be easily clamped with the first clamping section 72. Thus, the assembly operation of the image forming apparatus 1 is facilitated.

Further, if the first limiting section 73 is elastically deformable, then the first limiting section 73 can be protruded to be close to the first hook 65, thus reducing the possibility of the deviation of the claw section 65a of the first hook 65 from the first clamping section 72.

In the embodiment, the first limiting section 73 extends linearly in the direction opposite to the direction in which the first limiting section 73 faces the first hook 65. In this structure, the first limiting section 73 can be deformed elastically in the Z direction. Further, when applied with a force from the direction opposite to the X direction, the first limiting section 73 is extended. Thus, even if applied with a relatively large force, the first limiting section 73 bears the force without being curved. Consequentially, the first limiting section 73 is capable of firmly limiting the position of the first hook 65 in the X direction. That is, according to the foregoing structure, the assembly of the image forming apparatus 1 is facilitated and the possibility that the sensor 41 falls off is reduced.

In the embodiment, a working part 42 is also configured. The working part 42 functions by approaching the paper P conveyed in the conveyance path 13. The sensor 41 comprises the light emitting unit 51 and the light receiving unit 52 for receiving the light from the light emitting unit 51. The sensor 41 carries out a detection action by causing a part of the working part 42 to enter the space between the light emitting unit 51 and the light receiving unit 52. According to this structure, the sensor 41 configured to detect the position of paper P can be prevented from falling off.

In the embodiment, the first limiting section 73 extends along the direction in which the light emitting unit 51 and the light receiving unit 52 are arranged. The direction in which the light emitting unit 51 and the light receiving unit 52 are arranged is likely to be the length of the sensor 41. That is, in the embodiment, the first limiting section 73 is configured along the direction in which the light emitting unit 51 and the light receiving unit 52 are arranged. Thus, the base 43 is not large even if the first limiting section 73 is long, which is beneficial to the miniaturization of the sensor unit 31.

Embodiment 2

Next, the image forming apparatus 1 of embodiment 2 is described below.

In embodiment 2, the first limiting section 73 is L-shaped, which is different from that of embodiment 1. The other components of embodiment 2 are structurally identical to those of embodiment 1. Thus, the components of embodiment 2 identical to those of embodiment 1 are not described here.

Figure 8:
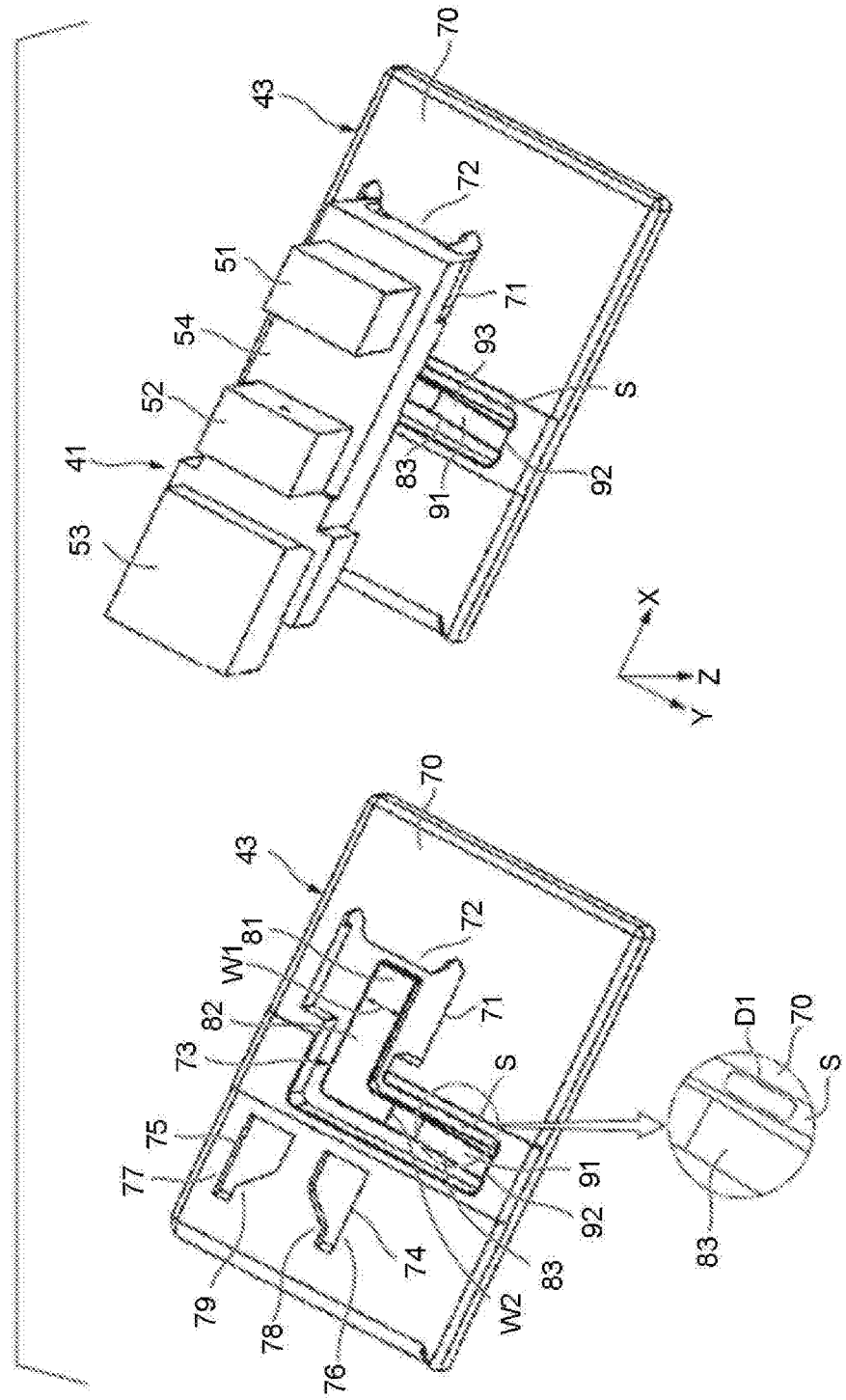
FIG. 8 is an oblique view of a sensor and a base according to embodiment 2.

FIG. 8 shows the sensor 41 and the base 43 of embodiment 2. As shown in FIG. 8, the first limiting section 73 is an L-shaped. Described in detail, the first limiting section 73 has an end part 81, a first part 82 and a second part 83.

The end part 81 faces the first hook 65 in the X direction.

The first part 82 extends linearly from the end part 81 in the direction opposite to the X direction. The first part 82 is equivalent to the extending part 82 of embodiment 1.

The second part 83 extends from the first part 82 in a direction intersecting with the first part 82. For example, the second part 83 extends towards a direction substantially orthogonal to the first part 82. The second part 83 extends linearly from the first part 82. The second part 83 is connected with the base 43 so as to be supported on the base 43. The second part 83 is elastically deformable in the direction from which the first part 82 departs from the first hook 65.

Described in detail, the width W2 of the second part 83 in the X direction is smaller than the width W1 of the first part 82 in the Y direction. Thus, the second part 83 is elastically deformable in the direction from which the first part 82 departs from the first hook 65.

Further, the second part 83 has a thick wall portion 91 the thickness of which in the Z direction is greater than that of the first part 82 in the Z direction. The thick wall portion 91 is arranged on the end of the second part 83 connected with the base 43, thereby increasing the rigidity of the connection part 92 of the second part 83 and the base 43.

As shown in FIG. 8, the first opening section 71 is corresponding in shape to the first limiting section 73. The first limiting section 73 is accommodated in the first opening section 71.

The second part 83 of the first limiting section 73 includes an exposed portion 93 which is not overlapped with the sensor 41 in the direction from which the sensor 41 is mounted on the base 43 (the Z direction). A slit S into which the front end of a tool can be inserted is formed between the exposed portion 93 of the second part 83 and the internal surfaces of the first opening section 71. For example, the tool is a screw driver D1. The tool is not limited to be a screw driver D1.

Sequentially, a method for removing the sensor 41 is described.

In the embodiment, the front end of the screw driver D1 is inserted into the slit S between the second part 83 of the first limiting section 73 and the internal surface of the first opening section 71. Then, the screw driver D1 is rotated. The second part 83 of the first limiting section 73 is elastically deformed in a direction departing from the first clamping section 72 so that the first part 82 of the first limiting section 73 is moved in a direction departing from the first hook 65. Consequentially, the first hook 65 is moved to a position where the claw section 65a is deviated from the first clamping section 72. In this way, the first hook 65 is deviated from the first clamping section 72.

After the first hook 65 is deviated from the first clamping section 72, the operator removes the first hook 65 from the first opening section 71. Moreover, after the first hook 65 is removed from the first opening section 71, the whole sensor 41 is moved towards the X direction. Then, the limitation of the second limiting section 78 and the third limiting section 79 to the second hook 66 and the third hook 67 is released. Consequentially, the second hook 66 and the third hook 67 are deviated from the second clamping section 76 and the third clamping section 77. Then, the sensor 41 is removed from the base 43.

With this structure, the removal of the sensor 41 is facilitated. That is, in the embodiment, the first limiting section 73 has a first part 82 extending in the direction opposite to the direction in which the first limiting section 73 faces the first hook 65 and a second part 83 extending in a direction intersecting with the first part 82. The second part 83 is elastically deformable in the direction the first part 82 departs from the first hook 65. With this structure, the limitation of the first limiting section 73 to the first hook 65 is released through the elastic deformation of the second part 83 so that the claw section 65a of the first hook 65 is deviated from the first clamping section 72. Then, the sensor 41 can be easily removed from the base 43. If the sensor 41 can be easily removed from the base 43, then the sensor 41 can be maintained or replaced easily.

In the embodiment, the base 43 has a first opening section 71 for accommodating the first limiting section 73. A slit S is formed between the second part 83 of the first limiting section 73 and the internal surface of the first opening section 71. According to this structure, the second part 83 can be elastically deformed easily by inserting a tool into the slit S between the second part 83 of the first limiting section 73 and the internal surface of the first opening section 71. Thus, the sensor 41 can be removed more easily.

Figure 9:
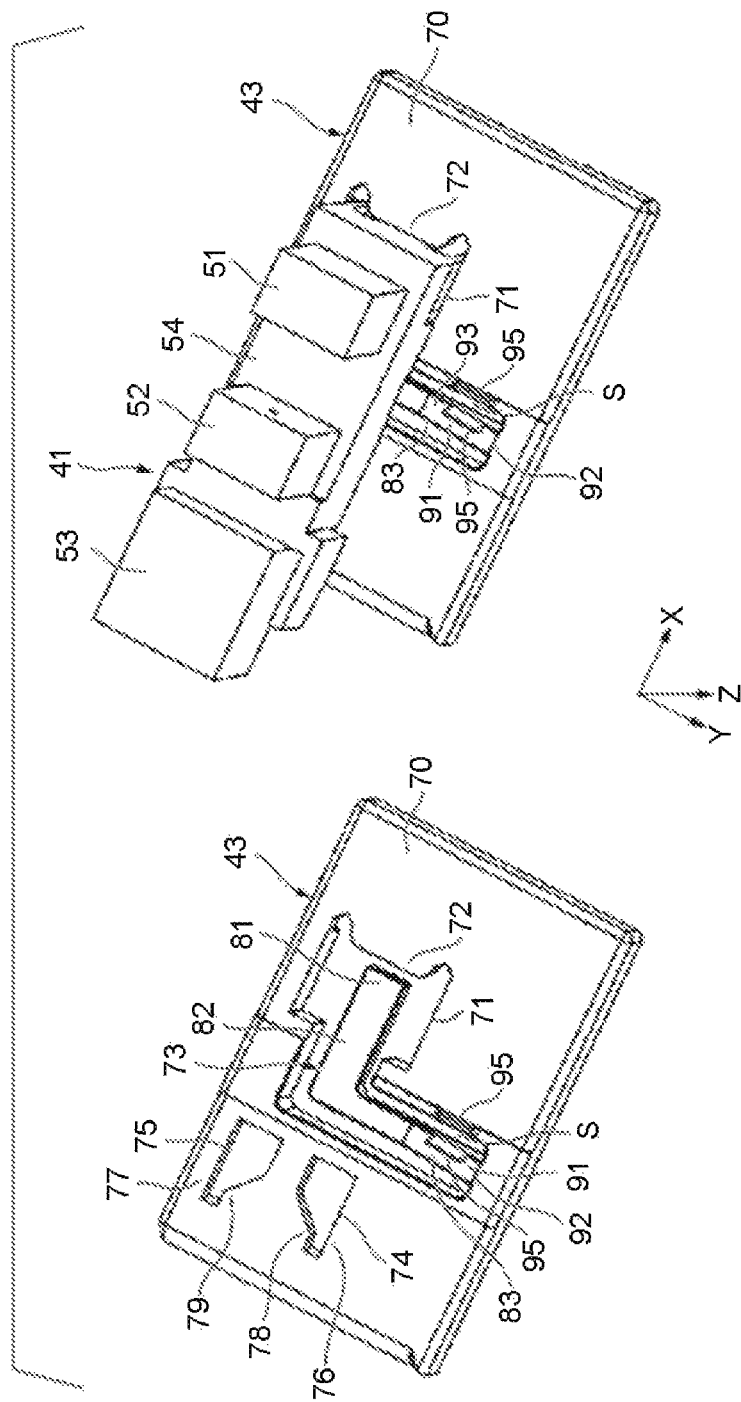
FIG. 9 is an oblique view exemplifying a variation of a base according to embodiment 2.

FIG. 9 exemplifies a variation of the image forming apparatus 1 according to the embodiment. As shown in FIG. 9, the base 43 may further comprise guiders 95. The guiders 95 are arranged on two sides of the slit S. That is, the guiders 95 are arranged on the second part 83 of the first limiting section 73 and the holding side 70. The guider 95 is capable of guiding a tool to the slit S between the second part 83 of the first limiting section 73 and the internal surface of the first opening section 71. With this structure, a tool can be inserted into the slit S between the second part 83 of the first limiting section 73 and the internal surface of the first opening section 71 more easily. Thus, the sensor 41 can be removed more easily.

Embodiment 3

Next, the image forming apparatus 1 of embodiment 3 is described below.

In embodiment 3, the second part 83 of the first limiting section 73 has a groove, which is different from that of embodiment 2. The other components of embodiment 3 are structurally identical to those of embodiment 2. Thus, the components of embodiment 3 identical to those of embodiment 1 and embodiment 2 are not described here.

Figure 10:
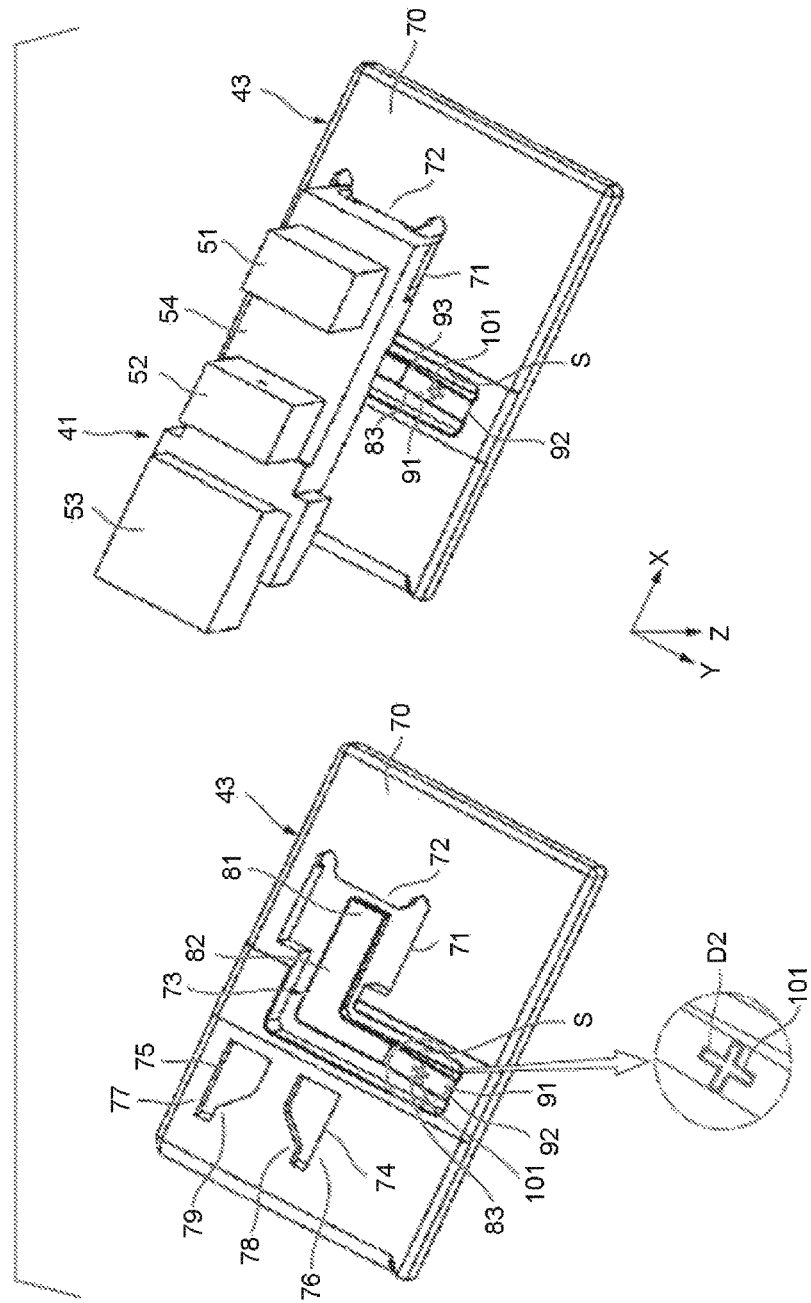
FIG. 10 is an oblique view illustrating a sensor and a base according to embodiment 3.

FIG. 10 shows the sensor 41 and the base 43 of embodiment 3. As shown in FIG. 10, the first limiting section 73 has a first side 73a and a second side 73b. The first side 73a faces the sensor 41. The second side 73b is located at the opposite side of the first side 73a.

In the embodiment, the first limiting section 73 has a groove 101. For example, the groove 101 is arranged on the first side 73a of the first limiting section 73. For example, the groove 101 is arranged on the exposed portion 93 of the second part 83 of the first limiting section 73. Thus, even if the sensor 41 is mounted on the base 43, the groove 101 is exposed outside. The groove 101 may also be arranged on the second side 73b of the first limiting section 73. For example, the groove 101 is located nearby the connection part 92 of the second part 83 and the base 43. For example, the groove 101 is closer to the connection part 92 than the first part 82.

The front end of a tool can be inserted into the groove 101. For example, the groove 101 is cruciform. For example, the tool is a cross screwdriver D2. For example, the tool is not limited to a cross screwdriver D2. Moreover, the groove 101 is not limited to be cruciform.

Next, a method for removing the sensor 41 is described.

In the embodiment, first, the front end of the cross screwdriver D2 is inserted into the groove 101 on the second part 83 of the first limiting section 73. Then, the cross screwdriver D2 is rotated so that the second part 83 of the first limiting section 73 is elastically deformed in a direction departing from the first clamping section 72. Thus, the first part 82 of the first limiting section 73 is moved in a direction departing from the first hook 65. Consequentially, the first hook 65 is moved to a position where the claw section 65a is deviated from the first clamping section 72 so that the first hook 65 is deviated from the first clamping section 72.

According to this structure, the removal of the sensor 41 is facilitated, like in embodiment 2. Further, in the embodiment, the groove 101 is arranged at a position where the groove 101 is not overlapped with the sensor 41 in the direction from which the sensor 41 is mounted on the base 43. With this structure, even if the sensor 41 is mounted on the base 43, the front end of a tool can be easily inserted into the groove 101 of the first limiting section 73.

Embodiment 4

Next, the image forming apparatus 1 of embodiment 4 is described below.

In embodiment 4, the first limiting section 73 is different from that of embodiment 3 in having a protruded point. The other components of embodiment 4 are structurally identical to those of embodiment 3. Thus, the components of embodiment 4 identical to those of embodiment 1 to embodiment 3 are not described here.

Figure 11:
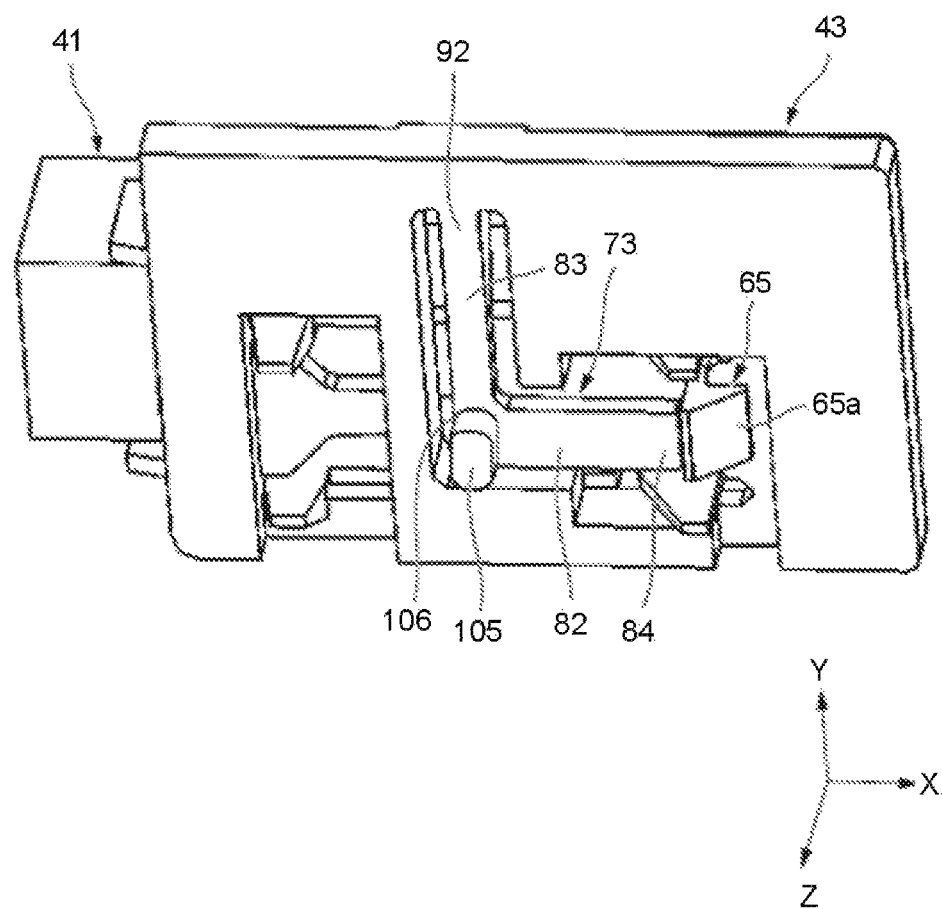
FIG. 11 is an oblique view illustrating a sensor and a base according to embodiment 4.

FIG. 11 shows the sensor 41 and the base 43 of embodiment 4. As shown in FIG. 11, the first limiting section 73 has a protrusion 105. For example, the protrusion 105 is arranged on the second side 73b of the first limiting section 73. For example, the protrusion 105 is arranged at a position where the protrusion 105 is overlapped with the sensor 41 in the direction from which the sensor 41 is mounted on the base 43 (the Z direction). For example, the protrusion 105 is arranged on the connection part 106 of the first part 82 and the second part 83. If the protrusion 105 is arranged at the position away from the connection part 92 of the second part 83 and the base 43, then the second part 83 can be elastically deformed when applied with a relatively small force.

Alternatively, the protrusion 105 is arranged on the first side 73a of the first limiting section 73. For example, the protrusion 105 is arranged on the exposed portion 93 of the second part 83 of the first limiting section 73.

Next, a method for removing the sensor 41 is described.

In the embodiment, the operator touches the protrusion 105 with fingers and presses the protrusion 105 towards a direction departing from the first clamping section 72. Then, the second part 83 of the first limiting section 73 is elastically deformed in the direction departing from the first clamping section 72. Thus, the first part 82 of the first limiting section 73 is moved away from the first hook 65. Consequentially, the first hook 65 is moved to a position where the claw section 65a is deviated from the first clamping section 72 so that the first hook 65 is deviated from the first clamping section 72.

According to this structure, the removal of the sensor 41 is facilitated, like in embodiment 2. Further, in the embodiment, the protrusion 105 is arranged on the second side 73b of the first limiting section 73. According to this structure, the sensor 41 can be easily removed even if the operator can only touch the back of the sensor 41.

In accordance with at least one of the foregoing embodiments, an image forming apparatus comprises a sensor, a base, a clamping section and a limiting section. The sensor includes a hook having a claw section. The sensor is held on the base. The clamping unit and the limiting unit are arranged on the base. The claw section is clamped with the clamping section. The limiting section is elastically deformable when the sensor is mounted on the base. When the claw section is clamped with the clamping section, the limiting section faces the hook from the opposite side of the clamping section, thereby limiting the position of the hook. Thus, the sensor 41 in the image forming apparatus 1 is prevented from falling off.

Here, the image forming apparatuses 1 of the foregoing embodiments 1-4 have a decoloration function of decolorizing the color of the image formed on paper P. Further, the 'decoloration' mentioned herein refers to decolorizing an image formed in a color different from the visible fundamental color of paper (including achromatic colors such as white and black in addition to chromatic colors). For example, the image forming apparatus 1 controls the temperature of the fixing section 16 at a decoloration temperature so as to decolorize the image on the paper P passing the fixing section 16. Thus, the image forming apparatus 1 is an example of a 'decolorization apparatus'. Further, the structures of embodiments 1-4 (e.g. the structures of the sensor 41 and the base 43) are also applicable to a decolorization apparatus not having an image forming function. Further, the 'image forming apparatus' and the 'decolorization apparatus' are both herein referred to as 'image processing apparatus'.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A decolorization apparatus, comprising:
   a sensor unit provided at least in part in a conveyance path; and
   a heater configured to heat a paper conveyed in the conveyance path to a deceleration temperature at which an image on the paper is decolorized,
   wherein, the sensor unit comprises:
   a sensor including a hook having a claw section;
   a base configured to hold the sensor;
   a clamping section configured on the base to clamp with the claw section; and
   a limiting section arranged on the base, wherein the limiting section which is elastically deformable when the sensor is mounted on the base faces the hook from the opposite side of the clamping section when the claw section is clamped with the clamping section so as to limit the position of the hook,
   wherein
   the claw section is clamped with the clamping section by inserting the hook into the space between the clamping section and the limiting section; and
   the limiting section is elastically deformed in the direction from which the hook is inserted when the hook is inserted into the space between the clamping section and the limiting section.

2. The decolorization apparatus according to claim 1, wherein
   the limiting section limits the hook at a position where the claw section is clamped with the clamping section.

3. The decolorization apparatus according to claim 1, wherein
   the limiting section extends linearly in the direction opposite to the direction in which the limiting section faces the hook.

4. A decolorization apparatus, comprising:
   a sensor unit provided at least in part in a conveyance path; and
   a heater configured to heat a paper conveyed in the conveyance path to a deceleration temperature at which an image on the paper is decolorized,
   wherein, the sensor unit comprises:
   a sensor including a hook having a claw section;
   a base configured to hold the sensor;
   a clamping section configured on the base to clamp with the claw section;
   a limiting section arranged on the base, wherein the limiting section which is elastically deformable when the sensor is mounted on the base faces the hook from the opposite side of the clamping section when the claw section is clamped with the clamping section so as to limit the position of the hook; and
   a working part which functions by approaching the paper conveyed in the conveyance path,
   wherein
   the sensor is equipped with a light emitting unit and a light receiving unit for receiving the light emitted from the light emitting unit, and the sensor carries out a detection action by causing a part of the working part to enter the space between the light emitting unit and the light receiving unit.

5. The decolorization apparatus according to claim 4, wherein
   the limiting section extends along the direction in which the light emitting unit and the light receiving unit are arranged.

6. A decolorization apparatus, comprising:
   a sensor unit provided at least in part in a conveyance path; and
   a heater configured to heat a paper conveyed in the conveyance path to a deceleration temperature at which an image on the paper is decolorized,
   wherein, the sensor unit comprises:
   a sensor including a hook having a claw section;
   a base configured to hold the sensor;
   a clamping section configured on the base to clamp with the claw section; and
   a limiting section arranged on the base, wherein the limiting section which is elastically deformable when the sensor is mounted on the base faces the hook from the opposite side of the clamping section when the claw section is clamped with the clamping section so as to limit the position of the hook, the limiting section has a first part extending in the direction opposite to the direction in which the limiting section faces the hook and a second part extending in a direction intersecting with the first part, and the second part is elastically deformable in the direction from which the first part departs from the hook.

7. The decolorization apparatus according to claim 6, wherein
the base has an opening section for accommodating the limiting section; and
a slit is formed between the second part of the limiting section and the internal surface of the first opening section.

8. The decolorization apparatus according to claim 6, wherein
the second part of the limiting section has a groove which is arranged at a position where the groove is not overlapped with the sensor in the direction from which the sensor is mounted on the base.

9. The decolorization apparatus according to claim 6, wherein
the limiting section has a first side facing the sensor and a second side on the opposite side of the first side; and
the second side of the limiting section has a protrusion.

* * * * *